July 11, 1939.  J. H. BOOTH  2,165,608

TRAILER TOWING SPRING SUSPENSION

Filed May 22, 1937  2 Sheets-Sheet 1

Inventor
James H. Booth
By Blackmore, Spencer & Flint
Attorneys

July 11, 1939.   J. H. BOOTH   2,165,608
TRAILER TOWING SPRING SUSPENSION
Filed May 22, 1937   2 Sheets-Sheet 2
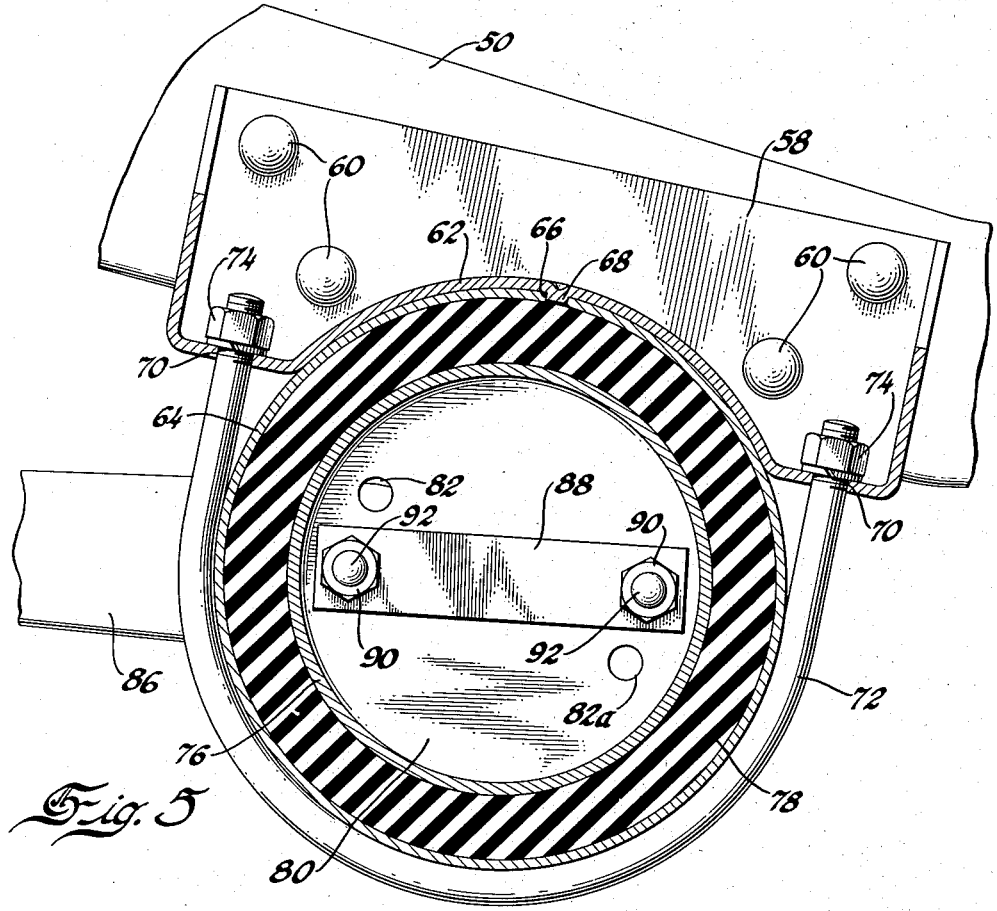
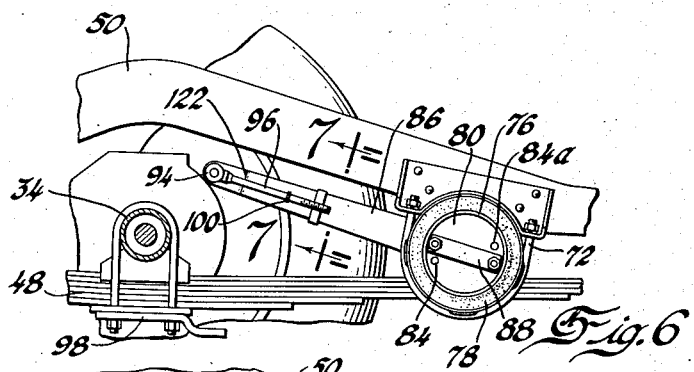
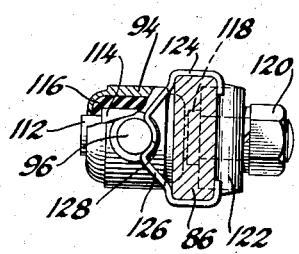
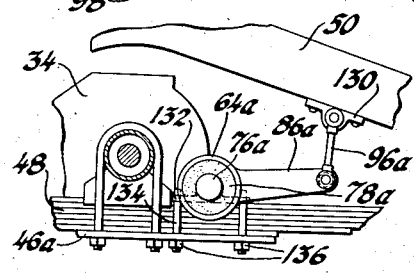
Inventor
James H. Booth Patented July 11, 1939

2,165,608

UNITED STATES PATENT OFFICE 2,165,608

TRAILER TOWING SPRING SUSPENSION

James H. Booth, Flint, Mich., assignor to General Motors Corporation, Detroit, Mich., a corporation of Delaware Application May 22, 1937, Serial No. 144,188

3 Claims. (Cl. 267—21)

This invention relates to a modified spring suspension for automotive vehicles when the vehicle is used to tow a trailer.

The structure of the invention is an improvement over the structure described and claimed in my copending application Ser. No. 115,754, filed December 14, 1936.

The ordinary rear leaf springs of an automotive vehicle are so designed and constructed best to respond to the sprung weight of the vehicle supported thereon and to give the best reactions to the average sprung weight. When the trailer is attached to the vehicle it places an additional load and an additional strain on the rear springs and interferes with their usual operation and response to the normal load conditions of travel of the vehicle. In investigating the load conditions imposed upon or added to the rear leaf springs of the ordinary automotive vehicle by the coupling to the vehicle of a trailer it was found if an additional or added spring tension or torsion could be applied while the trailer was being towed, that the normal responses of the spring suspension would be substantially equivalent to that of the normal spring with no trailer attached and give nearly the normal riding qualities. The outgrowth of the investigation of spring suspended vehicles with the trailer attached led to the instant invention in which two brackets, one attached to each side bar of the frame, suspend or rigidly hold two circular housings, one housing for each bracket. Inside each bracket there is in turn positioned a smaller circular housing which is spaced from the outer housing by means of a rubber ring which is tightly compacted between the two housings. An arm is rigidly secured to each inner housing and extends forwardly from the bracket toward the rear axle and has a link pivoted to its end which in turn is flexibly and removably connected to the rear axle. When additional loads are placed on the rear springs, such as by the use of a trailer being towed by the vehicle, the arm and inner housing will move relative to the outer housing in response to road shocks transmitted by the wheels and rear axle. The movement of the inner housing will cause the rubber to twist or to be placed under torsion and the additional spring resistance necessary because of the added load imposed by the trailer will be absorbed by the rubber.

On the drawings—

Figure 1:
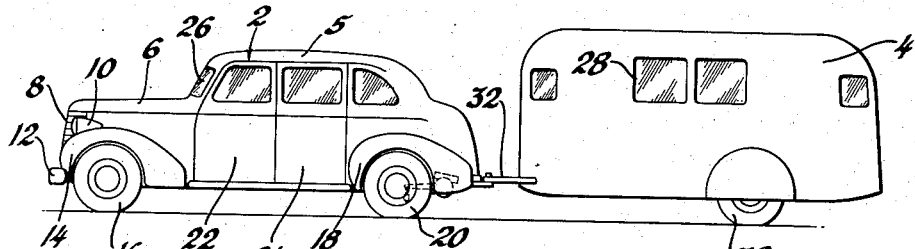
Figure 1 is a side view of an automotive vehicle with the trailer in tow, and showing the application of the invention.
Figure 2:
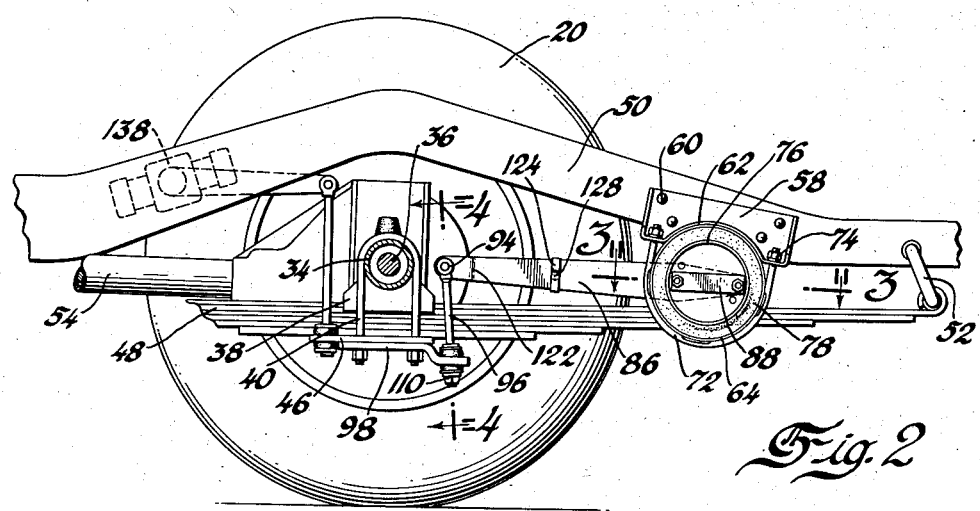
Figure 2 is an enlarged detailed view showing the invention applied to the rear of the vehicle, the view being taken just inside one of the wheels, the axle being shown in section.
Figure 3:
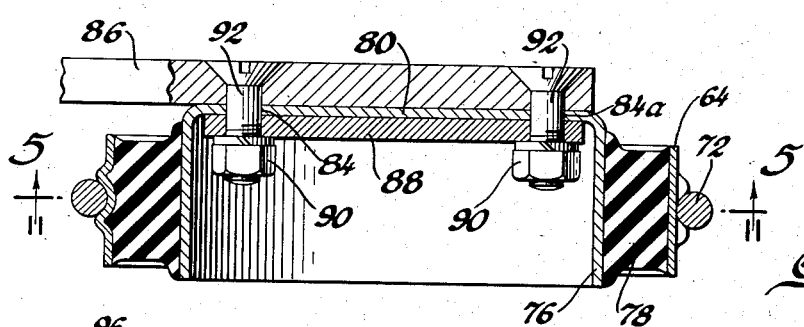
Figure 4:
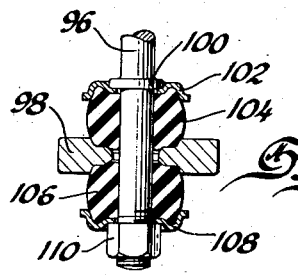

Figures 3 and 4 are enlarged sectional detailed views on the lines 3—3 and 4—4 of Figure 2.

Figure 5 is a sectional detailed view on the line 5—5 of Figure 3.

Figure 6 is a view similar to Figure 2 but showing the modified spring suspension disconnected.

Figure 7 is a section on the line 7—7 of Figure 6.

Figure 8 is a view similar to Figure 2 showing a modified form with the parts reversed.

On the drawings, the numeral 2 indicates the forward or towing vehicle, and 4 the towed trailer. The vehicle 2 has the usual metal top 5, hood 6, radiator grille 8, headlamps 10, bumper 12, front fender 14, front wheels 16, rear fender 18, rear wheels 20, front door 22, rear door 24, and windshield 26. The trailer 4 may be of any suitable type provided with suitable windows 28 and a suitable pair of wheels 30. The trailer 4 is connected to the towing vehicle 2 by means of any suitable type of connection 32.

Referring to Figure 2, the wheels 20 are supported on the rear axle housing 34 which encloses the driven axle 36. The axle 34 has secured thereto by means of the block 38, the U bolt 40, and the bottom plate 46, the usual type of rear spring 48. The spring 48 is pivoted at its forward end to the frame 50 and its rear end is shackled to the frame as at 52. The usual torque tube is indicated at 54 and houses the usual drive shaft, not shown.

The parts so far described are in general conventional, and per se form no part of the invention.

The parts of the invention are best shown in Figures 2 and 6 and comprise the brackets 58, one bracket being secured to each side bar 50 of the frame by means of the rivets or bolts 60. Each bracket 58 has the arcuate part 62 which extends over an arc of about 100° and is adapted to have received therein the outer or larger housing 64. The housing 64 has an opening 66 in its periphery and there is adapted to be received therein the lug or stud 68 from the middle part of the arcuate part 62, to aid in rigidly and immovably holding together the parts 62 and 64. The bracket sides extend beyond the periphery of the circular housing 64 and have openings 70 to receive the ends of the U bolt 72 which extends around the housing and rigidly holds the housing onto the bracket 58, the U bolt being fastened to place by the nuts 74.

Inside the housing 64 there is positioned a second housing 76, the housings 64 and 76 being concentric and spaced from each other, the space being filled by a rubber ring 78. Preferably the rubber 78 tightly and compactly fills the space between the housings 64 and 76 and if desired may be vulcanized to one or both housings.

The housing 76 is cup-shaped and has the integral end portion 80 provided with two sets of openings 82, 82a and 84, 84a (see Figures 5 and 6). To each housing 76 in the openings 84 and 84a in Figure 5 there is secured one arm 86, the arms being secured in place inside the housing 76 by means of the plates 88 and the nuts 90 which are screwed onto the threaded ends of machine screws 92. The arms 86 extend forwardly of the frame 50 toward the rear axle 34 as is best shown in Figure 2. At the forward end of each arm there is pivoted thereto the eye 94 of a rod 96 the lower end of which is removably and resiliently secured to a bracket or plate 98 secured to the axle 34. The rod is provided with a shoulder 100 against which there is received the retainer 102. A rubber block 104 is received in the retainer and rests on top of the bracket 98. A second rubber block 106 is positioned on the lower side of the bracket and a second retainer 108 abuts against the block 106. The nut 110 screwed onto the end of the rod 96 holds the parts in the interrelation shown in Figure 4.

The eye 94 is held to the end of the arm 86 by means of the bolt 112 which has an enlarged part 114 fitting inside the eye 94. A rubber ring 116 is positioned between the enlarged part 114 and the eye 94 and makes a resilient and noiseless connection. The bolt abuts against the arm end as shown at 118 and passes through an opening in the end of the rod. A nut 120 secures the bolt 112 to the rod.

The end of the arm 86 is slightly bent away from the main part thereof as indicated at 122 (Figures 6 and 7) so that the main part of the arm is in a different plane from the end. These two planes are best shown in Figure 7. Substantially midway of its length the arm 86 is provided with a clip 124 secured in the manner shown in Figure 7. The clip has a projecting part 126 facing the side to which the rod 96 is secured. The projecting part 126 has an arcuate recessed section 128 into which there is adapted to be received the end of the rod 96 when it is released from the bracket 98, this arrangement being best shown in Figures 6 and 7. It will be understood that when the vehicle 2 is not towing a trailer the structure of the invention may be disconnected to allow the vehicle spring 48 to assume its normal function. In the disconnected position shown in Figure 6 the arm has been removed from the openings 84, 84a, and has been secured in the openings 82 and 82a. This change in position throws the arm higher and brings it better out of liability of contact with the adjacent parts.

In Figure 8 a modification is shown. In this modification the housing 64a is mounted rigidly with the rear axle 34. Instead of the inner housing 76 the arm 86a is provided with a right-angled extension 76a which performs the functions of the housing 76 of the species of Figures 1-7 inclusive. The space between the housing 64a and the extension 76a of the lever 86a is filled with rubber 78a. The end of the arm 86a is connected by means of a link 96a to a bracket 130 secured to the frame 50. The connections of the link 96a with the arm 86a and the bracket 130 are pivotal. The housing 64a may be secured to the spring substantially at its mid portion as shown in Figure 8 and may be secured in the same manner that the housing 64 in Figure 5 is secured to the bracket 58. Preferably the housing 64a has the integral ears 132 through which are passed bolts 134, the lower ends of the bolts extending through an extension on the plate 46a and are secured in place by suitable nuts 136.

The operation of the structure is as follows: When the trailer 4 is in tow or is coupled to the towing vehicle 2 by means of the connection 32, the modified spring suspension is interconnected to the rear axle as shown in Figure 2. The additional load placed upon the vehicle by the trailer 4 will cause an added load to be placed on the rear springs 48 and because of the excess weight placed on the springs the added resistance offered by the structure of Figure 2 (each side of the vehicle is equipped with the same structure), the arm 86 will be moved to place the rubber 78 under torsion and cause the absorption therein of the additional weight, load or shock imposed on the springs by the weight of the trailer.

The vehicle is equipped with the usual hydraulic spring action modifiers or shock absorbers 138.

I claim:

1. In a modified spring suspension for a vehicle having a frame and a rear axle spring suspended from the frame, a housing secured to the frame, a second housing inside the first and spaced therefrom, rubber compactly filling the space between the two housings, said second housing having two sets of openings, an arm, means rigidly to secure said arm to the inner housing at one of its sets of openings, and means to connect the end of the arm to the axle, the movement of said arm causing the inner housing to move to place the rubber under torsion, said arm being releasable from the axle and capable of being secured in the second set of openings to retain the arm in released position.

2. In a modified spring suspension for a vehicle having a frame and a rear axle spring suspended from the frame, a housing secured to the frame, a second housing inside the first and spaced therefrom, rubber compactly filling the space between the two housings, said second housing having two sets of openings, an arm, means rigidly to secure said arm to the inner housing at one of its sets of openings, means to connect the end of the arm to the axle, the movement of said arm causing the inner housing to move to place the rubber under torsion, said arm being releasable from the axle and capable of being secured in the second set of openings to retain the arm in released position, and a clip on the arm to hold said means in inoperative position when the modified suspension means is disconnected from the axle.

3. In a modified spring suspension for a vehicle having a frame and a rear axle spring suspended from the frame, a bracket secured to the frame, a first housing fitting to the bracket, means to secure the housing to the bracket, a second smaller housing surrounded by the first housing, rubber bonded to both housings and compactly filling the space therebetween, an arm secured to the second housing, and means detachably to connect the arm end to the axle, the movement of said arm causing the inner housing to move relative to the outer housing to place the rubber under torsion, said second housing having means to attach said arm in a second and inoperative position, and said arm having means to hold said last-named means in fixed position relative thereto.

JAMES H. BOOTH.